United States Patent
Liu et al.

(10) Patent No.: US 10,640,104 B2
(45) Date of Patent: May 5, 2020

(54) ANTICIPATORY CONTROL FOR HYBRID VEHICLE PROPULSION SYSTEM

(71) Applicant: GM GLOBAL TECHNOLOGY OPERATIONS LLC, Detroit, MI (US)

(72) Inventors: Jinming Liu, Pontiac, MI (US); Lan Wang, Pontiac, MI (US); Goro Tamai, Pontiac, MI (US); Norman K. Bucknor, Pontiac, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 277 days.

(21) Appl. No.: 15/883,241

(22) Filed: Jan. 30, 2018

(65) Prior Publication Data

US 2019/0232942 A1  Aug. 1, 2019

(51) Int. Cl.
*B60W 20/19* (2016.01)
*B60W 30/188* (2012.01)
*B60W 20/12* (2016.01)
*B60W 10/06* (2006.01)
*B60W 10/08* (2006.01)
(Continued)

(52) U.S. Cl.
CPC ............ *B60W 20/19* (2016.01); *B60W 10/06* (2013.01); *B60W 10/08* (2013.01); *B60W 20/12* (2016.01); *B60W 20/20* (2013.01); *B60W 20/40* (2013.01); *B60W 30/1882* (2013.01); *B60W 2400/00* (2013.01); *B60W 2510/244* (2013.01); *B60W 2550/22* (2013.01); *B60W 2550/30* (2013.01)

(58) Field of Classification Search
CPC ...... B60W 20/12; B60W 20/13; B60W 20/19; B60W 10/06; B60W 10/08; B60W 30/188; B60W 30/1882
See application file for complete search history.

(56) References Cited

U.S. PATENT DOCUMENTS

| | | |
|---|---|---|
| 5,931,757 A | 8/1999 | Schmidt |
| 2007/0078580 A1 | 4/2007 | Cawthorne |
| 2018/0265069 A1* | 9/2018 | Weisbeck et al. |

OTHER PUBLICATIONS

Brendon M. Conlon et al; The Next Generation "Voltec" Extended Range EV Propulsion System; SAE International; Published Apr. 14, 2015.

* cited by examiner

*Primary Examiner* — Erin D Bishop
(74) *Attorney, Agent, or Firm* — Reising Ethington P.C.

(57) ABSTRACT

A system and method are provided for placing a hybrid vehicle having a plurality of electric propulsion motors into an operating state in anticipation of a vehicle event, the method may include the steps of: monitoring roadway traffic and conditions surrounding a vehicle using one or more vehicle sensors and/or wireless communications; anticipating a vehicle propulsion operation change based on the monitored roadway traffic and conditions; in response to anticipating the vehicle propulsion operation change, obtaining a present propulsion operating state; and carrying out an anticipatory vehicle propulsion system transition before receiving a vehicle propulsion operation change request. The anticipatory vehicle propulsion system transition may include the steps of: calculating an intermediary propulsion operating state based on the present propulsion operating state and/or the monitored roadway traffic and conditions; and operating an internal combustion engine and a first electric propulsion motor such that the vehicle is placed in the intermediary propulsion operating state.

20 Claims, 4 Drawing Sheets

(51) Int. Cl.
*B60W 20/20* (2016.01)
*B60W 20/40* (2016.01)

ANTICIPATORY CONTROL FOR HYBRID VEHICLE PROPULSION SYSTEM

TECHNICAL FIELD

The present invention relates generally to controlling a propulsion system included in a hybrid vehicle, including transitioning to an intermediary vehicle propulsion operating state in response to anticipating a change in the operation of the propulsion system.

BACKGROUND

Vehicles include various electronics that can be used to sense and analyze certain operating conditions and vehicle events surrounding a vehicle. Moreover, vehicles can include multiple primary propulsion components, such as an internal combustion engine (ICE) and one or more electric motors. The engine and motors can be used together to provide propulsion and can be controlled by a control system that includes, for example, an engine control module (ECM). The ECM and the other various vehicle electronics may be coupled to one another via a communications bus and, thus, the ECM may be controlled based on information from the various vehicle electronics.

SUMMARY

According to one embodiment, there is provided a method of placing a hybrid vehicle having a plurality electric propulsion motors into an operating state in anticipation of a vehicle event, the method including: monitoring roadway traffic and conditions surrounding a vehicle using one or more vehicle sensors and/or wireless communications; anticipating a vehicle propulsion operation change based on the monitored roadway traffic and conditions; in response to anticipating the vehicle propulsion operation change, obtaining a present propulsion operating state; and carrying out an anticipatory vehicle propulsion system transition before receiving a vehicle propulsion operation change request, the anticipatory vehicle propulsion system transition including: calculating an intermediary propulsion operating state based on the present propulsion operating state and/or the monitored roadway traffic and conditions; and operating an internal combustion engine of the vehicle and a first one of the plurality of electric propulsion motors of the vehicle such that the vehicle is placed in the intermediary propulsion operating state.

According to another embodiment, there is provided a method of placing a hybrid vehicle having a plurality of electric propulsion motors into an operating state in anticipation of a vehicle event, the method including: receiving images using at least one camera included in the vehicle, wherein the at least one camera is configured to capture the images of an area surrounding the vehicle; anticipating a vehicle propulsion operation change based on receiving an indication of a vehicle event associated with a change in vehicle propulsion output, wherein the indication of the vehicle event associated with the change in vehicle propulsion output is at least partly based on the received images; determining a state of charge of a vehicle battery that provides electric power as a primary power source to a plurality of electric motors included in the vehicle; in response to anticipating the vehicle propulsion operation change and when the state of charge of the vehicle battery is greater than or equal to a state of charge threshold value, then carrying out an anticipatory vehicle propulsion system transition that includes: (i) obtaining a present operating state or parameter; (ii) determining an anticipated propulsion operating state or parameter based on the anticipated vehicle propulsion operation change request; (iii) obtaining an intermediary propulsion operating state based on the present propulsion operating state or parameter and/or based on the anticipated propulsion operating state or parameter; and (iv) operating an internal combustion engine of the vehicle and the plurality of electric propulsion motors of the vehicle such that the vehicle is placed in the intermediary propulsion operating state; receiving a vehicle propulsion operation change request after the operating step, wherein the vehicle propulsion operation change request reflects an intention to place the vehicle into a requested propulsion operating state; and in response to receiving the vehicle propulsion operation change request, transitioning from the intermediary propulsion operating state to the requested propulsion operating state using the internal combustion engine and/or at least one of the plurality of electric propulsion motors.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION OF THE EMBODIMENTS

The system and method provided below enable a vehicle to anticipatorily transition to an intermediary propulsion operating state based on anticipating a change in vehicle operation demands through use of vehicle sensors and/or communications. Through the use of various vehicle computing devices and sensors, a vehicle may anticipate a vehicle operation request or state change, such as a user or autonomous vehicle speed (or torque) request. For example, a vehicle may use a front camera and a global navigation satellite system (GNSS) receiver to determine that the vehicle is entering an interstate or highway and, thus, the vehicle may determine that it will soon receive a request to increase its velocity so that the vehicle be able to smoothly merge into the highway/interstate traffic. Thus, at least according to some embodiments, the method and system provided herein can be used to anticipate such a vehicle torque (or speed) increase request and, in response thereto, the vehicle can be placed into an anticipatory propulsion operating state so that, when the vehicle torque (or speed) request is actually received, the vehicle may more smoothly, quickly, and/or efficiently transition to a new vehicle operating state that is associated with the vehicle torque (or speed) request.

According to various embodiments, the system and method provide for a transition between a present propulsion operating state to an anticipated propulsion operating state in an improved and/or more efficient manner. As used herein, a vehicle operating state refers to a vehicle state representing a combination of vehicle states pertaining to all vehicle propulsion apparatuses including electric motors configured to provide propulsion to the vehicle, as well as internal combustion engines (ICEs) configured to provide propulsion to the vehicle. Thus, the present propulsion operating state refers to a vehicle operating state at the present time and the anticipatory vehicle operating state refers to a vehicle operating state that is anticipated for a future time based on, for example, sensor data from various vehicle sensors. And, moreover, an intermediary propulsion operating state refers to a vehicle operating state that can be used so as to transition the vehicle from the present propulsion operating state to the anticipatory vehicle operating state.

In one embodiment, a vehicle can implement a hybrid electronically variable transmission (EVT) system that includes an internal combustion engine (ICE) and one or more electric motors. The hybrid EVT system may include a particular mechanical arrangement of gears that couple the engine and the one or more electric motors to one or more shafts such that either and/or both of the ICE and the electric motors are capable of driving one or more vehicle wheels thereby propelling the vehicle. In a particular embodiment, the vehicle can include a single ICE and two electric motors, each of which is uniquely arranged within the hybrid EVT system so as to enable the hybrid EVT system to operate in a variable and coordinated manner.

In one embodiment employing the hybrid EVT system, an anticipated propulsion operating state can be determined along with a present propulsion operating state. When a vehicle detects or determines that a vehicle operating state may soon change (or may soon significantly change), the vehicle can calculate an intermediary propulsion operating state. In some embodiments, the intermediary propulsion operating state can be derived from a present propulsion operating state, an anticipated propulsion operating state, and/or other vehicle states. After an intermediary propulsion operating state is calculated (or otherwise determined), the vehicle can operate any one or more of its primary propulsion components so as to transition from the present propulsion operating state to the intermediary propulsion operating state. Thereafter, when the vehicle receives a request to transition the primary propulsion system to a requested propulsion operating state (which, can be similar or the same as the anticipated propulsion operating state), the vehicle can then operate any one or more of its primary propulsion apparatuses so as to transition from the intermediary propulsion operating state to the requested (or anticipated) vehicle operating state.

This intermediary transition can result in anticipatorily or proactively placing the vehicle primary propulsion system in the intermediary propulsion operating state such that, at least in some scenarios, the engine speed of the ICE increases while the engine power (or drive torque) is maintained. Thus, by increasing the engine speed of the ICE while maintaining the same propulsion output power, the vehicle can be placed in a position or operating state so as to improve drive quality by, for example, lowering the response time (as measured from the receipt of the vehicle speed/torque request) it takes to transition to the requested propulsion operating state, lowering the electric motor speed to enable higher electric motor torque, and minimizing turbo lag by achieving a higher torque ramp up rate.

In one particular embodiment, when it is determined that a vehicle will soon receive a vehicle acceleration request (e.g., vehicle speed/torque increase request), the vehicle can calculate an intermediary propulsion operating state. The intermediary propulsion operating state can include a higher vehicle engine speed (more revolutions per minute (RPM)) and a vehicle overall drive torque that is the same as the present propulsion operating state so that the vehicle maintains a constant velocity until the vehicle actually receives the vehicle acceleration request, which can then result in transitioning the vehicle from the intermediary propulsion operating state to the requested propulsion operating state. Thus, use of the intermediary propulsion operating state can place the vehicle into a state that maintains the vehicle velocity and that prepares the vehicle primary propulsion system for a transition to a different operating state such as that which includes operating the vehicle at a higher vehicle velocity. This anticipatory vehicle propulsion system transition process, at least in some embodiments, allows the vehicle to more easily, quickly, and/or efficiently transition to the requested propulsion operating state, which, at least in some embodiments, includes a higher engine speed than that which is included in the present propulsion operating state, but does so in a manner that may remain largely unnoticed by the driver.

Additionally, according to some embodiments, the transition from the present propulsion operating state to the anticipated propulsion operating state via use of an intermediary propulsion operating state may require additional power from one or more electric motors of the vehicle thereby causing the state of charge of the vehicle battery to decrease. Thus, before calculating and/or determining whether to transition to the intermediary propulsion operating state, the vehicle can determine a present state of charge (SoC) of a vehicle battery that supplies electric power to the electric motors. Then, the vehicle can determine whether the present SoC of the vehicle battery is sufficient so as to warrant the transition to the intermediary propulsion operating state. Such a determination may be based on whether the present SoC exceeds a predefined or predetermined SoC threshold. If such threshold is met, the vehicle can proceed with the anticipatory vehicle propulsion system transition process, which includes transitioning from the present propulsion operating state to the intermediary propulsion operating state.

Figure 1:
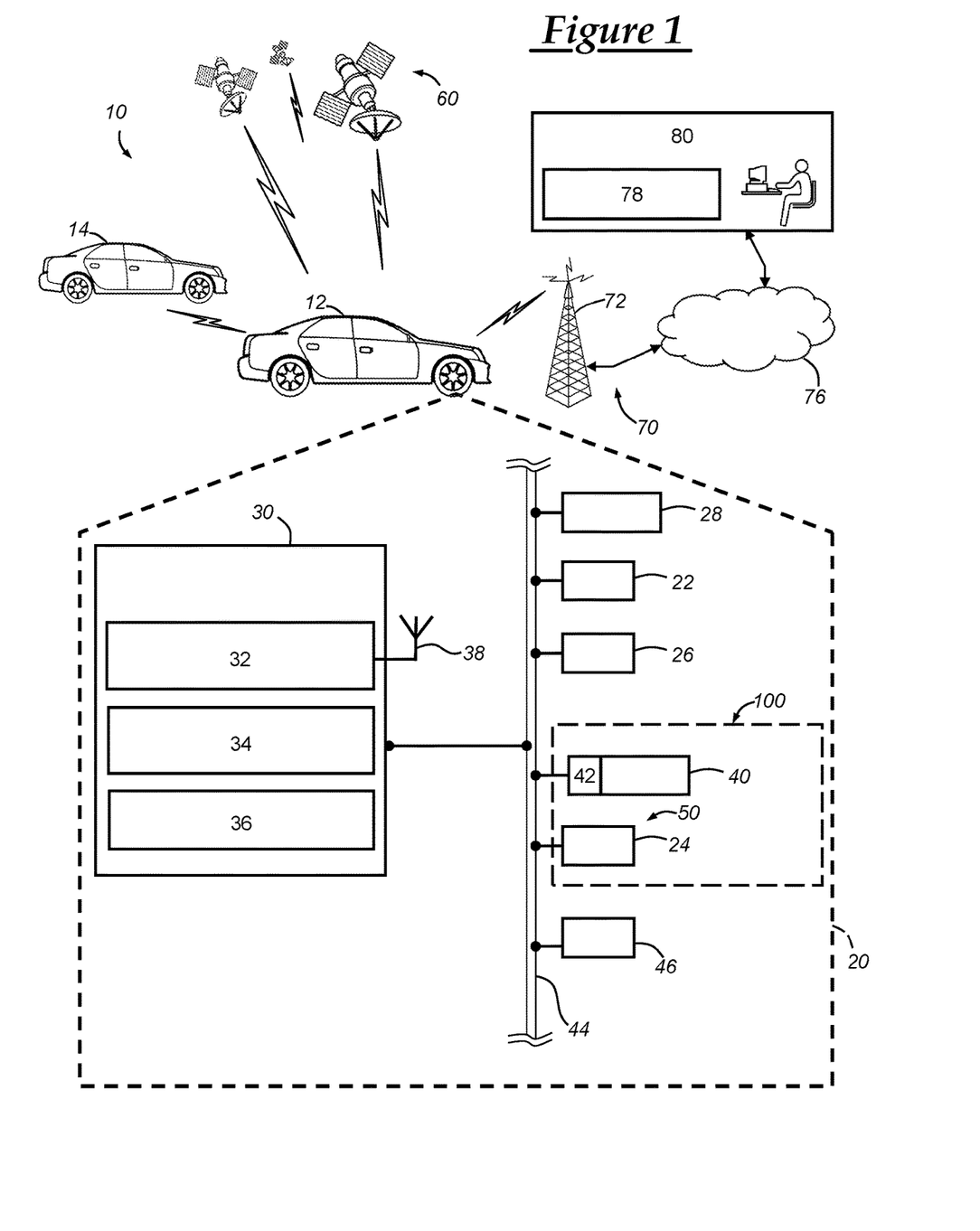
FIG. 1 is a block diagram depicting an example of a communications system that may be used with a vehicle.

With reference to FIG. 1, there is shown an operating environment having a communications system 10 and that can be used to implement the method disclosed herein. Communications system 10 generally includes a vehicle 12 with a propulsion system 100, another vehicle 14, one or more wireless carrier systems 70, a land communications network 76, and a remote facility 80. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which include telematics equipment in vehicle 12). Carrier system 70 can implement any suitable communications technology, including for example GSM/GPRS technology, CDMA or CDMA2000 technology, LTE technology, etc.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. Each such computer 78 can be used for one or more purposes, such as a web server accessible by vehicle 12. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, remote facility 80, or both. A computer 78 can also be used for providing Internet connectivity such as DNS services or as a network address server that uses DHCP or other suitable protocol to assign an IP address to the vehicle 12.

Remote facility 80 may be designed to provide the vehicle electronics 20 with a number of different system back-end functions. The remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76. A database at the remote facility can store account information such as subscriber authentication information, vehicle identifiers, profile records, behavioral patterns, and other pertinent subscriber information. Data transmissions may be conducted by wireless systems, such as IEEE 802.11x, GPRS, and the like.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Also, other vehicle 14 can include similar components as vehicle 12 (as described below) and can also be any other type of vehicle, such as those listed above. Some of the vehicle electronics 20 are shown generally in FIG. 1 and include an onboard computer 30, a battery 40, a global navigation satellite system (GNSS) receiver 22, an engine control unit (ECU) 24, a body control unit (BCM) 26, a camera 28, other VSMs 46, and numerous other components and devices. Some or all of the different vehicle electronics may be connected for communication with each other via one or more communication busses, such as bus 44. Communications bus 44 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few.

The vehicle 12 can include numerous vehicle system modules (VSMs) as part of vehicle electronics 20, such as GNSS receiver 22, ECU 24, BCM 26, camera 28, and onboard computer 30, as will be described in detail below. The vehicle 12 can also include other VSMs 46 in the form of electronic hardware components that are located throughout the vehicle and, which may receive input from one or more sensors and use the sensed input to perform diagnostic, monitoring, control, reporting, and/or other functions. For example, other VSMs may include a telematics unit, a center stack module (CSM), an infotainment unit, a powertrain control module, or a transmission control unit. Each of the VSMs 46 is preferably connected by communications bus 44 to the other VSMs, as well as to the onboard computer 30, and can be programmed to run vehicle system and subsystem diagnostic tests. As is appreciated by those skilled in the art, the above-mentioned VSMs are only examples of some of the modules that may be used in vehicle 12, as numerous others are also possible.

Figure 2:
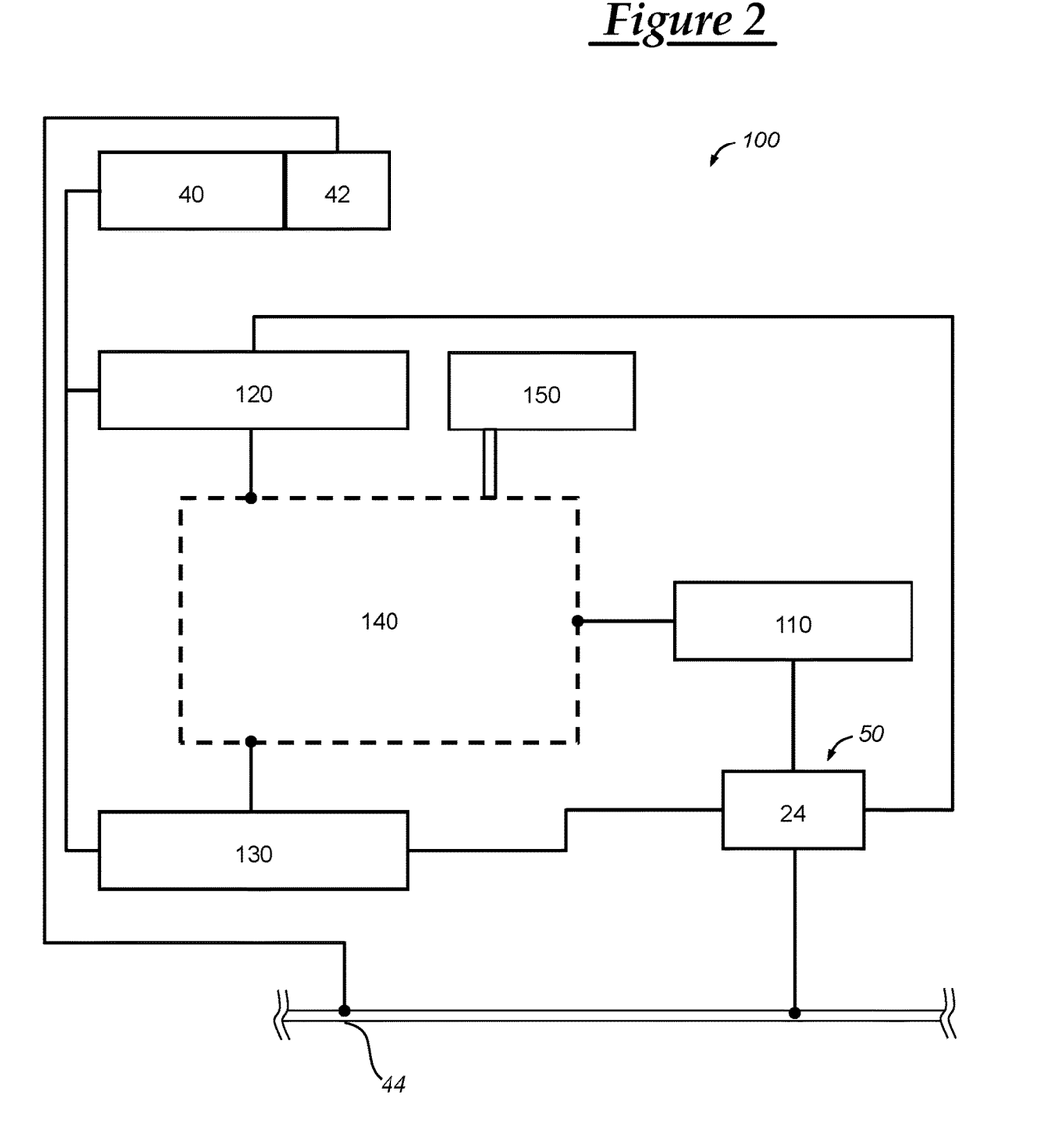
FIG. 2 is a block diagram depicting an example of a vehicle propulsion system that may be used with a vehicle.

Engine control unit (ECU) 24 may control various aspects of engine operation such as fuel ignition and ignition timing. ECU 24 is connected to communications bus 44 and may receive operation instructions from BCM 26 or other VSMs 46, such as onboard computer 30. In one scenario, the ECU 24 may receive commands from the BCM to propulsion system operation request that directs the propulsion system 100 to adjust certain operating parameters of the propulsion system 100 such as the engine speed, engine torque, electric motor speed, electric motor torque, vehicle speed, vehicle torque, and/or various other parameters. ECU 24 may control internal combustion engine (ICE) 110, as well electric motors 120 and 130 (FIG. 2). However, in other embodiments, a separate controller can be included to control electric motors 120 and 130.

Body control module (BCM) 26 is shown in the exemplary embodiment of FIG. 1 as being electrically coupled to communication bus 44. In some embodiments, the BCM 26 may be integrated with or part of a center stack module (CSM) and/or integrated with onboard computer 30. Or, the BCM may be a separate device that is connected to one another via bus 44. BCM 26 can include a processor and/or memory, which can be similar to processor 34 and memory 36 of onboard computer 30, as discussed below. BCM 26 may communicate with onboard computer 30 and/or one or more vehicle system modules, such as ECU 24 or other VSMs 46. BCM 26 may include a processor and memory such that the BCM may direct one or more vehicle operations including, for example, controlling central locking, air conditioning, power mirrors, controlling the vehicle primary mover (e.g., engine, primary propulsion system), and/or controlling various other vehicle modules. BCM 26 may receive data from onboard computer 30 and, subsequently, send the data to one or more vehicle modules.

Additionally, BCM 26 may provide information corresponding to the vehicle state or of certain vehicle components or systems. For example, the BCM may provide the onboard computer 30 with information indicating whether the vehicle's ignition is turned on, the gear the vehicle is presently in (i.e. gear state), and/or other information regarding the vehicle. In one embodiment, the method 200 (FIG. 3) may be initiated upon one or more vehicle states, such as a vehicle ignition on condition (i.e., a vehicle state where the ignition is turned on). And, in some embodiments, the method may use vehicle state information for carrying out one or more steps. In such embodiments, the BCM 26 may obtain and send information to onboard computer 30, including vehicle speed, trailer articulation angle, steering wheel angle, and various other information that may be obtained from other VSMs or sensors installed on the vehicle.

Vehicle cameras or sensors 28 (only one shown) can be used to capture photographs, videos, and/or other information pertaining to light. Camera 28 can be an electronic digital camera that is powered through use of a vehicle battery. Camera 28 may include a memory device and a processing device to store and/or process data that it captures or otherwise obtains. The data obtained by the camera 28 may be sent to another vehicle system module (VSM) such as the on-board computer 30 of the vehicle. Camera 28 may be of any suitable camera type (e.g., charge coupled device (CCD), complementary metal oxide semiconductor (CMOS), etc.) and may have any suitable lens known in the art so that it is not limited to any particular type, brand, or model. Some non-limiting examples of potential embodiments or features that may be used with camera 28 include: infrared LEDs for night vision; wide angle or fish eye lenses; surface mount, flush mount, license mount, or side mount cameras; stereoscopic arrangements with multiple cameras; cameras integrated into tail lights, brake lights, or other components at the rear end of the vehicle; and wired or wireless cameras, to cite a few possibilities.

Camera 28 can be installed and/or mounted on vehicle 12 and may be configured to face in a rearward or forward direction with respect to the vehicle such that the camera can capture an area located behind and/or in front of the vehicle. The camera 28 can be used to capture images that can then be processed, such as by onboard computer 30, to anticipate changes in vehicle torque or speed that are to be requested in the near future. For example, camera 28 can be used to capture an image, a series of images, or a video of another vehicle 14 and, based on results of image processing, the vehicle 12 can predict whether an operator will soon request to increase the vehicle speed and/or torque. In this way, as illustrated below in method 200 of FIG. 3, the vehicle can anticipatorily transition the propulsion system 100 to an intermediary operating state thereby reducing vehicle resources and/or providing an improved user experience when the anticipated torque or speed request is actually received. In other embodiments, cameras 28 can be installed and/or mounted on a left and/or a right side of vehicle 12 such that the cameras 28 face an area to the sides of vehicle 12.

Figure 3:
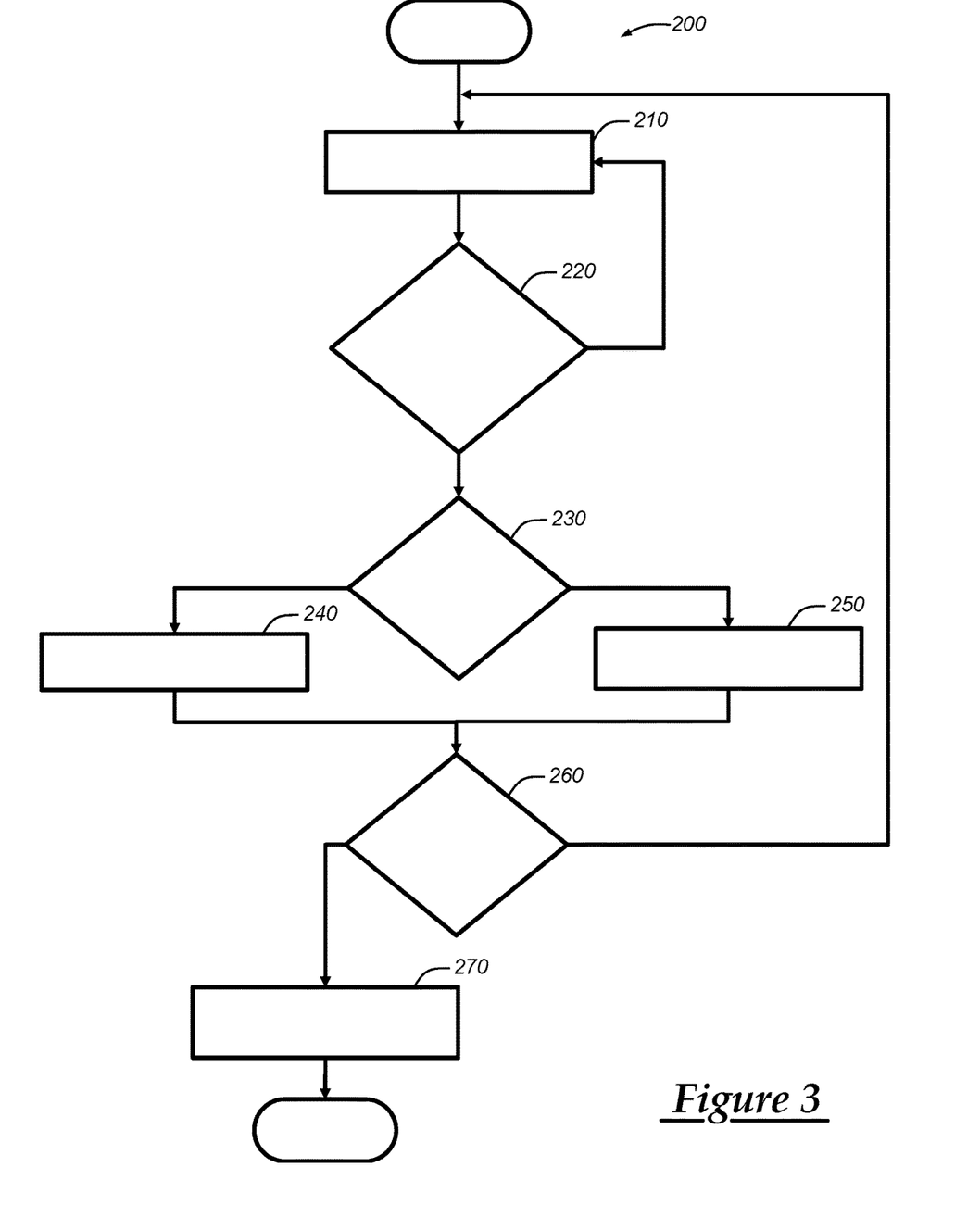
FIG. 3 is flowchart illustrating embodiments of a method of placing a vehicle into an operating state in anticipation of a vehicle event.

Onboard computer 30 is a vehicle system module that includes a processor 34 and memory 36 and, in some embodiments, can also include a wireless chipset or circuitry 32 that enables wireless communications to be carried out with, for example, a cellular carrier system or another local wireless device. Additionally, at least in some embodiments, onboard computer 30 can be an infotainment unit (e.g., infotainment head unit, in-vehicle infotainment (IVI)), a vehicle head unit, a center stack module (CSM), or vehicle navigation module. As discussed below, onboard compute 30 can be used to carry out at least some of the steps of method 200 (FIG. 3).

Processor 34 can be any type of device capable of processing electronic instructions including microprocessors, microcontrollers, host processors, controllers, vehicle communication processors, and application specific integrated circuits (ASICs). It can be a dedicated processor used only for onboard computer 30 or can be shared with other vehicle systems. Processor 34 executes various types of digitally-stored instructions, such as software or firmware programs stored in memory 36, which enable the computer 30 to provide a wide variety of services. For instance, processor 34 can execute programs or process data to carry out at least a part of the method discussed herein. Memory 36 may include RAM, other temporary powered memory, any non-transitory computer-readable medium (e.g., EEPROM), or any other electronic computer medium that stores some or all of the software needed to carry out the various external device functions discussed herein.

As mentioned above, onboard computer 30 may include a wireless chipset or circuitry 32 that can be used to carry out wireless communications using antenna 38. In one embodiment, wireless chipset 32 is a cellular chipset that is configured to carry out cellular communications using a cellular carrier system, such as those that may implement GSM/GPRS technology, CDMA or CDMA2000 technology, LTE technology, etc. Additionally, or alternatively, onboard computer 30 may include a short-range wireless communications (SRWC) circuit that enables SRWC to be carried out using SRWC technologies including Wi-Fi™, WiMAX™, ZigBee™, Wi-Fi Direct™, other IEEE 802.11 protocol, Bluetooth™, Bluetooth™ Low Energy (BLE), or near field communication (NFC). In other embodiments, wireless communications may be carried out at another vehicle system module (VSM) that is connected to bus 44.

With reference to FIG. 2, there is provided a vehicle primary propulsion system 100 including a battery 40, control system 50 (which can include ECU 24), an internal combustion engine (ICE) 110, a first electric motor 120, a second electric motor 130, a transmission 140, and a drive axle 150. ICE 110, first electric motor 120, and second electric motor 130 can be used to generate drive torque that is applied to drive axle 150 via transmission 140. Patent Application Publication No. "2016/0009268" is incorporated herein by reference in its entirety and includes an example of a hybrid EVT system that can be used in conjunction with the system and/or method discussed herein. It should be appreciated that this reference describes one such hybrid EVT system and that various other systems and/or components can be used in conjunction with the system and method discussed below.

Electric motors 120 and 130 may use electrical energy stored in battery 40 to drive the vehicle wheels, which in turn propels the hybrid vehicle 12. While FIG. 1 schematically depicts electric motors 120 and 130 as single discrete devices, the electric motors may each be combined with a generator (a so-called "mogen") or it may include additional electric motors (e.g., separate motors for the front and rear wheels, separate motors for each wheel, separate motors for different functions, etc.), to cite a few possibilities. Thus, the following description only refers to a propulsion system 100 that includes first electric motor 120, second electric motor 130, and ICE 110, even though other electric motors, engines, or other torque generating mechanisms can be used by the hybrid vehicle 12. Electric motors 120 and 130 are not limited to any one particular type of electric motor, as many different motor types, sizes, technologies, etc. may be used. In one example, electric motors 120 and 130 each includes an AC motor (e.g., a three-phase AC induction motor, etc.) as well as a generator that can be used during regenerative braking. The electric motors may be provided according to any number of different embodiments (e.g., AC or DC motors, brushed or brushless motors, permanent magnet motors, etc.), may be connected in any number of different configurations, and may include any number of different components, like cooling features, sensors, control units and/or any other suitable components known in the art. In addition, each electric motor can be used to generate electric power that is then stored by battery 40 and/or other storage means.

Internal combustion engine (ICE) 110 may be driven according to conventional internal combustion techniques, and may include any suitable type of engine known in the art. Some examples of suitable engines include gasoline, diesel, ethanol, flex-fuel, naturally aspirated, turbo-charged, super-charged, rotary, Otto-cycle, Atkins-cycle, and Miller-cycle engines, as well as any other suitable engine type known in the art. According to one embodiment, engine 110 can be a small fuel-efficient engine that receives fuel from a vehicle fuel tank and uses the mechanical output of the engine to drive the vehicle wheels and/or to drive one or more other axles or rotors coupled to a generator or mogen. Skilled artisans will appreciate that engine 110 may be provided according to any number of different embodiments, may be connected in any number of different configurations, and may include any number of different components, like sensors, control units and/or any other suitable components known in the art.

Battery 40 may store electrical energy that is used to drive electric motors 120 and/or 130, as well as to meet other electrical needs of the hybrid vehicle. According to an exemplary embodiment, battery 40 includes a high-voltage battery pack (e.g., 40V-600V). The battery pack can include a number of individual battery cells and may utilize any suitable battery chemistry, including those that are based on the following technologies: lithium ion, nickel metal hydride (NiMH), nickel cadmium (NiCd), sodium nickel chloride (NaNiCl), or some other battery technology. Battery 40 should be designed to withstand repeated charge and discharge cycles and may be used in conjunction with other energy storage devices, such as capacitors, super capacitors, inductors, etc. The battery 40 may include or be coupled to a battery gauge 42 that can measure a state of charge (SoC) of the battery and report the SoC to onboard computer 30 and/or various vehicle system modules (VSMs) via, for example, communications bus 44. Those skilled in the art will appreciate that battery 40 may be provided according to any number of different embodiments, may be connected in any number of different configurations, and may include any number of different components, like sensors, control units and/or any other suitable components known in the art.

Control system 50 may be used to control, govern, or otherwise manage certain operations or functions of hybrid vehicle 12 including at least some of those of method 200 and, according to one exemplary embodiment, includes an engine control unit (ECU) 24. Control system 50 may use stored algorithms or other electronic instructions to manage certain activities of the various components and devices of both the electric motors 120 and 130, as well as ICE 110. In at least one embodiment, control system 50 can include a separate electronic control module that is particularly configured to control electric motors 120 and 130. And, depending on the particular embodiment, this separate control module may be a stand-alone electronic module, it may be incorporated or included within another electronic module in the vehicle (e.g., onboard computer 30, a telematics module, a power train control module, ECU 24, etc.), or it may be part of a larger network or system (e.g., a battery management system (BMS), a vehicle energy management system, etc.), to name a few possibilities.

Transmission 140 can include various gearing arrangements, shafts, clutches, and other mechanical coupling components and hardware that can be used to provide power to drive axle 150. In one embodiment, a rotor from the first electric motor 120 can be connected to a planetary gear set that is then connected to a crank shaft of ICE 110. Additionally, a rotor from the second electric motor 130 can be mechanically coupled to the planetary gear set (or to the crank shaft) via various gears or other mechanical interfacing arrangements. In one embodiment, the first and second electric motors 120 and 130 can provide torque to drive axle 150 that can supplement the torque provided by ICE 110 via the crank shaft. By using multiple motors, the propulsion system can provide a stable torque output while varying the electric motor speeds and/or ICE speed, which, at least in some embodiments, can provide for more efficient and/or quicker transitions between propulsion operating states. Drive axle 150 can be coupled to one or more vehicle wheels and, in some embodiments, multiple drive axles can be coupled to transmission 140.

With reference to FIG. 3, there is provided a method 200 of placing a vehicle into an operating state in anticipation of a vehicle event. Method 200 can be carried out by onboard computer 30 and/or various other vehicle system modules, including ECU 24, control system 50, and/or other electric motor controllers. In one embodiment, at least some of the method steps are carried out by onboard computer 30. And, in another embodiment, at least some of the method steps are carried out by control system 50, which can include ECU 24. Although method 200 is described below in the context of a vehicle propulsion system having two electric propulsion motors, those skilled in the art will recognize that the method 200 can applied to vehicles having more than two electric propulsion motors.

Method 200 begins with step 210, wherein the vehicle monitors roadway conditions, including traffic and roadway features. As used herein, "roadway conditions" refers to any properties, states, conditions, or characteristics of the roadway surrounding or in the path of the vehicle's route. And, as used herein, "consequential roadway conditions" refers to those roadway conditions that can or that typically cause a change in operation of the vehicle's primary propulsion system, such as a change in output torque, vehicle speed, direction, or trajectory. Some non-limiting examples of roadway conditions can be traffic (e.g., position of other nearby vehicles, speed or velocity of other nearby vehicles), weather conditions (e.g., ice, snow, rain), and roadway features (e.g., maps of the roadway (including geographical maps), number of lanes, speed limit, type of roadway, roadway disturbance (including lane closures, reduced speed limits) due to construction or other disturbing elements, pedestrians or animals, stop lights or signs). In one embodiment, the vehicle can monitor traffic by receiving data from other vehicles (e.g., vehicle 14) via use of vehicle-to-vehicle (V2V) technologies. And, additionally or alternatively, vehicle 12 can use camera 28 and/or various other vehicle sensors to monitor vehicle traffic conditions, including turns and/or other characteristics of the roadway upon which the vehicle is traveling. The vehicle can use these various electronics, including sensors and communication modules, to determine one or more vehicle traffic conditions, which are observed or obtained vehicle states of one or more other vehicles near vehicle 12 and which may be used to indicate an event (e.g., turning, accelerating) of the other vehicles.

In one embodiment, vehicle 12 can use a front-facing camera that is installed and/or mounted on the vehicle such that the field of view of the front-facing camera is directed to an area in front of the vehicle. The vehicle can use computer vision techniques (or image/object recognition techniques) to determine that the vehicle 12 is merging onto a highway or interstate, which typically indicates that vehicle speed is to be increased so that the vehicle may safely travel at a speed corresponding to the other highway or interstate traffic. And, in a particular embodiment, the vehicle 12 may use GNSS receiver 22 to receive a plurality of GNSS signals from a constellation of GNSS satellites 60 to corroborate that the vehicle is entering a highway or interstate. In addition, geographical, traffic, and roadway map data can be downloaded to onboard computer 30 so that highways or other roadways to enable the vehicle to determine or corroborate other sensor information indicating that the vehicle is entering a highway or interstate and/or that the vehicle may soon receive a vehicle propulsion operation change request.

Additionally and/or alternatively, vehicle 12 may include a rear-facing camera that is installed and/or mounted on the vehicle such that the field of view of the rear-facing camera is directed to an area behind the vehicle. Vehicle 12 can use the rear-facing camera to determine that a car behind vehicle 12 is approaching and/or is within a distance that is considered safe. In such a scenario, the vehicle 12 may soon receive a vehicle torque or speed increase request from a vehicle operator.

And, in other embodiments, vehicle 12 may include side-facing cameras that are installed and/or mounted on the vehicle such that the field of view of a first side-facing camera is directed to an area to the left side of vehicle 12 and the field of view of a second side-facing camera is directed to an area to the right side of vehicle 12. Using either side-facing camera and/or the front-facing camera, the vehicle can determine that another vehicle 14 that is located in front of vehicle 12 is near completion of performing a turn and, thus, that the vehicle 12 may soon receive a vehicle torque or speed increase request from a vehicle operator.

In yet another embodiment, the vehicle 12 can receive information from roadside monitoring and control systems via use of vehicle-to-infrastructure (V2I) technologies. The V2I data can be information concerning roadway conditions, including roadway traffic information and/or information regarding roadway features. The information may also be relayed from a remote server or computer, such as remote facility 80 or computer 78. This information can be used to determine whether a vehicle propulsion operation change request is anticipated (see step 220). Various other scenarios and/or embodiments exist that may cause the vehicle to determine that a vehicle torque or speed increase or decrease request may be soon received from a vehicle operator. The method 200 continues to step 220.

In step 220, a vehicle propulsion operation change request is anticipated based on the monitored roadway traffic. That is, based on the monitoring step, which can include various processing, the vehicle determines that a change in the vehicle propulsion operation is soon to occur or is soon to likely occur. In one embodiment, the vehicle can determine a probability of whether the vehicle propulsion operation change request is going to occur and, when the probability is greater than a predetermined probability value, it can be determined that a vehicle propulsion operation change request is anticipated. In other embodiments, an indication of a vehicle event associated with a change in vehicle propulsion output may be received. A vehicle event that is associated with a change in vehicle propulsion can be another vehicle 14 turning or nearly completing a turn, another vehicle 14 changing lanes or approaching vehicle 12, a stop light changing from a stop signal to a proceed signal (e.g., "RED" to "GREEN" light), and/or various other traffic events that may cause or that typically are associated with a change in the output of the propulsion system (e.g., increase of vehicle speed or torque, or decrease of vehicle speed or torque).

In one embodiment, the vehicle can be configured with a plurality of predefined or predetermined conditions that, when met, result in the vehicle anticipating a vehicle propulsion operation change request. For example, the plurality of predefined conditions can be stored in memory 36 of onboard computer 30 and, as the vehicle monitors traffic and other roadway conditions, the vehicle can compare the present conditions to the predefined conditions. Upon the present conditions corresponding to a stored condition, the vehicle may determine that a vehicle propulsion operation change request is soon to likely occur. The vehicle can include an application or can otherwise be configured to carry out the monitoring and determining steps (steps 210-220) using a processor, such as processor 34 of onboard computer 30. The vehicle can record any of the obtained monitoring data from step 210. The method 200 continues to step 230 when it is determined that a vehicle propulsion operation change request is anticipated; otherwise, the method 200 proceeds to step 210.

In step 230, it is determined whether the state of charge (SoC) of the battery exceeds or is equal to a state of charge threshold. If the present SoC of the vehicle's primary battery for powering electric motors 120 and 130 is too low (e.g., below the state of charge threshold), then it may be determined that anticipatorily transitioning to an intermediary propulsion operating state is not desirable. For example, the benefits of such a transition to an intermediary state while the battery SoC is low may not be worth the costs; however, in other embodiments, the method 200 may not include step 230, but may directly proceed from step 220 to step 240. In one embodiment, the SoC threshold can be set at a normal SoC.

In one embodiment of step 230, the vehicle can obtain the present SoC of the vehicle battery 40 using battery gauge 42. The battery gauge 42 can be coupled to the battery such that "coulomb counting" can be used to determine the battery's SoC, which can be defined as the ratio of the residual charge of the battery to the battery's capacity or rating. Once the present SoC of the battery is determined, the present SoC can be compared to a SoC threshold. The SoC threshold can be predetermined or predefined and stored in memory 36. The SoC threshold can be recalled from memory and then compared to the present SoC using, for example, processor 34. When it is determined that the present SoC is above the SoC threshold, then the method 200 continues to step 240; otherwise, the method 200 continues to step 250.

Figure 4:
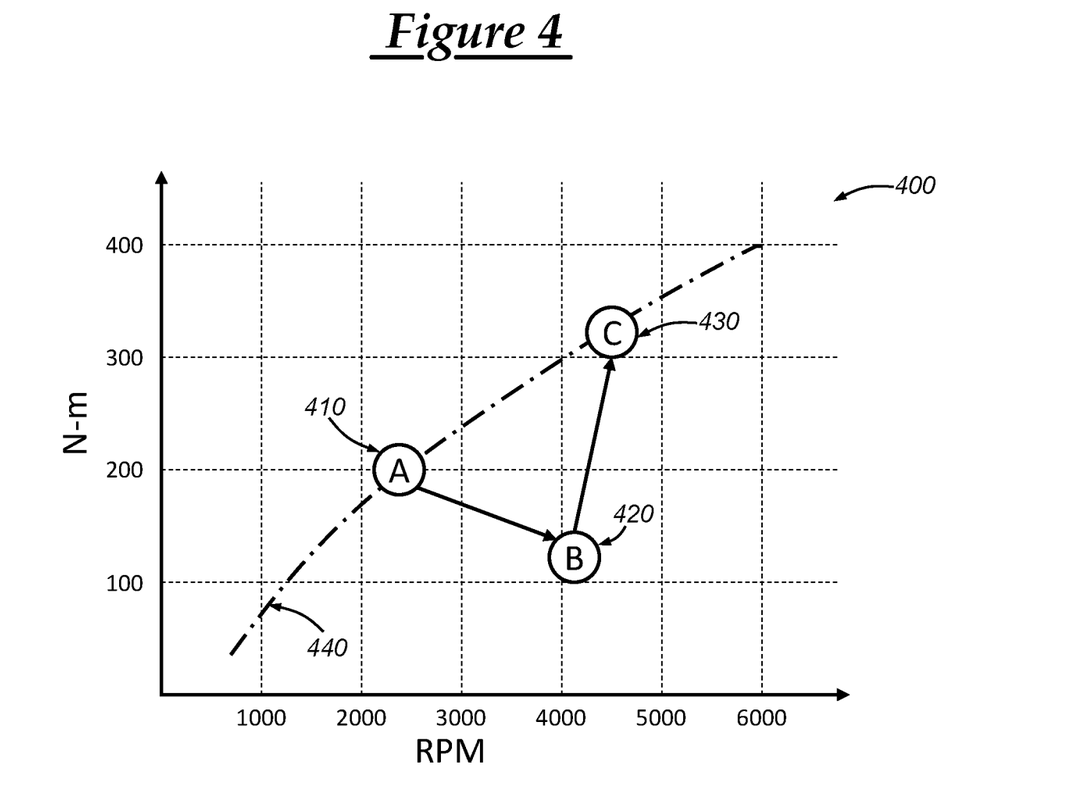
FIG. 4 is an example of a graph illustrating a scenario in which the vehicle transitions from a present propulsion operating state to an intermediary propulsion operating state and finally to a requested propulsion operating state.

In step 240, it can be determined that the vehicle is to use the first motor and/or the second motor to transition from propulsion operating state "A" (i.e., the present propulsion operating state) to propulsion operating state "B" (i.e., the intermediary propulsion operating state). With reference to FIG. 4, there is shown an example graph 400 of a scenario in which the vehicle transitions from present propulsion operating state "A" (410) to intermediary propulsion operating state "B" (420) and, finally, when the vehicle propulsion operation change request is received, the vehicle transitions to requested operation state "C" (430). Reference line 440 depicts a typical engine operation curve using present control systems that do not anticipatorily determine an anticipated engine operation state and/or an intermediate state, but rather react to vehicle propulsion operation change requests when they are received (such as that which would be the case when method 200 proceeds to step 250 instead of step 240). The Y- or vertical-axis of graph 400 is engine torque in Newton-meters (N-m) and the X- or horizontal-axis of the graph 400 is engine speed (i.e., speed of the internal combustion engine) in rotations per minute (RPM). As illustrated, the intermediary state "B" is depicted at a lower engine torque and a higher engine speed that is close to the anticipated engine speed that will be a result of the anticipated vehicle propulsion operation change request.

In one embodiment, the vehicle can obtain a present propulsion operating state and an anticipated propulsion operating state and, based thereon, determine an intermediary propulsion operating state. As mentioned above, this step can include obtaining a present propulsion operating state and an anticipated propulsion operating state in response to anticipating the vehicle propulsion operation change request. The present propulsion operating state refers to the present state (i.e., at the time of anticipating the propulsion operation change request (step 220)) of the primary propulsion system 100, including the states of the internal combustion engine 110, the first motor 120, the second motor 130, and/or the transmission 140. And, the anticipated propulsion operating state is the vehicle state of the primary propulsion system 100 that the vehicle determines will likely occur as a result of the anticipated vehicle propulsion operation change request. Any one of the propulsion operating states can be determined through accessing various vehicle modules, including ECU 24 and BCM 26 (or other control module that is a part of control system 50) at the time step 230 or step 240 is reached. Or, the vehicle operating states can be constantly monitored and stored into memory, such as memory 36, and, thus, upon the method reaching step 240, the vehicle operating states may be recalled from memory. And, at least in some embodiments, the anticipated propulsion operating state can be calculated at the time of anticipating a vehicle propulsion operation change request.

In one embodiment, the anticipated propulsion operating state can be determined after or in response to the anticipating the vehicle propulsion operation change request. Thus, after determining that there is likely to be a change in the vehicle propulsion system 100, the vehicle can obtain various information, such as vehicle speed (including wheel speed from various wheel speed sensors included on the vehicle), vehicle steering wheel angle, road conditions (including roadway speed limits), traffic conditions (including the locations and/or speeds of nearby traffic such as vehicle 14), conditions or states of ICE 110, conditions or states of electric motors 120 and 130, conditions or states of transmission 140, the results of the monitoring (step 210), and/or various other information. Any or all of this information can be used to calculate or determine the anticipated propulsion operating state and, in some embodiments, the data or information used to calculate the anticipated propulsion operating state may change depending on the scenario (e.g., whether vehicle 12 is merging onto a highway or interstate, whether another vehicle 14 is approaching vehicle 12 from behind).

In various scenarios and/or embodiments, road conditions and/or traffic conditions can be obtained and used for calculating the anticipated propulsion operating state. For example, the vehicle can use wireless chipset 32 of onboard computer 30 to query a database that is located at remote facility 80 to obtain roadway information. The roadway information can include a roadway map of an area surrounding the vehicle and, also, can include other pertinent information such as current traffic information (i.e., whether the traffic is slow compared to the designated speed limit or compared to the typical or average speed) and the designated speed limit of the roadway. This information can be supplemented by, or obtained based on, various information of the vehicle 12, including the speed of vehicle 12 and/or the location of the vehicle 12. And, this information can be supplemented by traffic information. For example, the vehicle can obtain certain traffic information from processing captured images from cameras 28. Cameras 28 can capture images from areas surrounding the vehicle and, as the images are being received by onboard computer 30, the images can be processed using various image processing techniques including through use of object recognition techniques that can identify one or more other vehicles. Additionally, the vehicle can process these received images to determine the presence of one or more other vehicles 14, the velocity of the other vehicles 14, and/or various other attributes of such vehicles.

In addition to determining these states, the vehicle can determine one or more propulsion operating parameters that are to be changed such that the vehicle transitions from the present propulsion operating state to the intermediary propulsion operating state. For example, the vehicle propulsion operating states can include an engine torque and/or an engine speed (e.g., rotations per minute (RPM)). Then, through use of a specially-configured application or instructions, the vehicle can use the various engine torques and speeds to calculate one or more operating parameters for the first and second electric motors such that the vehicle will transition from the present propulsion operating state to the intermediary vehicle operating state. In addition, the vehicle can determine those operating parameters for motors 120 and 130 for a transition from the intermediary vehicle operating state to the anticipated vehicle operating state. However, in some scenarios, the anticipated vehicle operating state may differ from the requested vehicle operating state (step 260-270) and, thus, these operating parameters for the intermediary-to-anticipated vehicle operating state transition may not be calculated.

After it is determined that the vehicle is to use the first motor and/or the second motor to transition from the present propulsion operating state to the intermediary propulsion operating state, the vehicle can then carry out the transition. As mentioned above, a set of vehicle electric motor operating parameters can be calculated based on the intermediary propulsion operating state and/or the present propulsion operating state, including the particular engine speeds and/or torques. In one embodiment, the onboard computer 30 can send operating instructions to ECU 24, BCM 26, and/or other electric motor controller that causes the electric motors 120 and 130 to operate according to the calculated vehicle electric motor operating parameters.

In one particular scenario, the anticipated vehicle propulsion operation change request may reflect a change to a higher vehicle speed, which may preferably include a higher engine speed. Thus, the vehicle may reduce the speed of the second electric motor 130, while increasing the speed of the first electric motor 120 and increasing the speed of ICE 110 to achieve a higher engine speed in anticipation of receiving a vehicle speed increase request. In such a scenario, the overall vehicle speed will remain the same when the vehicle transitions from the present propulsion operating state to the intermediary propulsion operating state so as to not distract and/or disturb one or more vehicle operators and/or passengers, although the engine torque may be decreased. In this scenario, the transmission output torque is to remain the same, but the speed of the second motor can be decreased so as to enable the second motor to provide more torque to assist ICE 110 in maintaining the transmission output torque. And, additionally, the engine speed can then be increased and the speed of the first motor 120 can be increased as well so that the primary propulsion system 100 can transition more efficiently and/or quickly when the vehicle propulsion operation change request is received (step 260). Additionally, this transition can also include modifying one or more parameters of transmission 140, including the engagement and/or disengagement of various clutches. The method 200 continues to step 260.

In step 250, it is determined that the vehicle is to use the first motor and/or the second motor to transition from propulsion operating state "A" (i.e., the present propulsion operating state) to propulsion operating state "C" (i.e., the anticipated/requested propulsion operating state). In many embodiments, this determination can result in the vehicle carrying out its propulsion system operations normally—that is, the vehicle may simply transition from the present propulsion operating state to a requested propulsion operating state after or in response to receiving a vehicle speed or torque request (step 260). In other embodiments, the vehicle can wait to change its operating state, but may calculate one or more operating parameters that are to be used to transition from the present propulsion operating state to a requested propulsion operating state after or in response to receiving a vehicle speed or torque request. These operating parameters can then be saved and, upon receiving a vehicle speed or torque request, the vehicle can recall these parameters and operate the propulsion system 100 accordingly. However, the vehicle speed and torque do not change until the vehicle propulsion operation change request is received (step 260). The method 200 continues to step 260.

In step 260, a vehicle propulsion operation change request is received. The vehicle propulsion operation change request can be a request to change the vehicle speed or torque of the ICE 110. In one embodiment, the vehicle propulsion operation change request can be generated and received from ECU 24 and/or other VSM of vehicle 12. And, in some embodiments, the vehicle propulsion operation change request can be received from a gas pedal or brake pedal that is actuated by a vehicle operator. And, in other embodiments, the vehicle propulsion operation change request can be generated by ECU 24 and/or other VSM based on one or more control signals from an autonomous vehicle propulsion application or module.

In some embodiments, when the time between anticipating a vehicle propulsion operation change request and receiving the vehicle propulsion operation change request is greater than a predetermined time threshold, then the method 200 can proceed back to step 210. Otherwise, until the time between anticipating a vehicle propulsion operation change request and receiving the vehicle propulsion operation change request exceeds the predetermined time threshold, the vehicle can wait to receive vehicle propulsion operation change request. The method continues to step 270 when the vehicle propulsion change request is received; otherwise, the vehicle waits for the vehicle propulsion operation change request or proceeds back to step 210.

In step 270, the vehicle uses the first motor and/or the second motor to transition to a requested propulsion operating state "C" (i.e., the anticipated/requested propulsion operating state). As mentioned above, the anticipated propulsion operating state may differ than the requested propulsion operating state that is determined based on the received vehicle propulsion operating change request. However, the vehicle can be updated such that the process or method improves predicting a requested vehicle propulsion operating change.

In one embodiment, the vehicle can determine the requested propulsion operating state based on the current propulsion operating state (e.g., present propulsion operating state (step 230) or the intermediary propulsion operating state (step 240)), as well as based on the information contained in the vehicle propulsion operating change request that was received. Once the requested operating state is determined, the vehicle can then determine one or more vehicle propulsion operating parameters for electric motors 120 and 130, as well as ICE 110, that can be used in effecting the transition from the current propulsion operating state to the requested propulsion operating state. The onboard computer 30 can stored this information and/or send instructions containing the vehicle propulsion operating parameters to the ECU 24, BCM 26, and/or other electric motor controller. And, in other embodiments, the onboard computer 30 can send the vehicle propulsion operating change request to such module (e.g., ECU 24, BCM 36, other electric motor controller) and, in response thereto, the module can determine the vehicle propulsion operating parameters to use in effecting the transition from the current propulsion operating state to the requested propulsion operating state.

In some embodiments, the anticipated vehicle state and a determination of whether the anticipated propulsion operating state occurred (or the differences between the anticipated propulsion operating state and the requested propulsion operating state), as well as the information or data used in steps 210-260, can be stored in memory 36. Thereafter, the vehicle can use this information to improve the process for future iterations of method 200.

And, in some embodiments, during the execution of method 200, the vehicle can continuously monitor propulsion system states, as well as vehicle traffic and roadway conditions. And, when it is indicated that the vehicle is most likely to not soon receive a vehicle propulsion operation change request corresponding to the determined anticipated propulsion operating state, then the method 200 can proceed back to step 210 thereby abandoning the rest of the method steps. The method 200 then ends.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A method of placing a hybrid vehicle having a plurality of electric propulsion motors into an operating state in anticipation of a vehicle event, the method comprising:
monitoring roadway traffic and conditions surrounding the vehicle using one or more vehicle sensors and/or wireless communications;
anticipating a vehicle propulsion operation change based on the monitored roadway traffic and conditions;
in response to anticipating the vehicle propulsion operation change, obtaining a present propulsion operating state; and
carrying out an anticipatory vehicle propulsion system transition before receiving a vehicle propulsion operation change request, the anticipatory vehicle propulsion system transition including:
calculating an intermediary propulsion operating state based on the present propulsion operating state and/or the monitored roadway traffic and conditions; and
operating an internal combustion engine of the vehicle and a first one of the plurality of electric propulsion motors of the vehicle such that the vehicle is placed in the intermediary propulsion operating state.

2. The method of claim 1, further comprising the step of obtaining an anticipated propulsion operating state based on the monitored roadway traffic and conditions, and wherein the calculating step is based at least partly on the anticipated propulsion operating state.

3. The method of claim 2, further comprising the steps of:
receiving the vehicle propulsion operation change request after the anticipating step, wherein the vehicle propulsion operation change request reflects an intention to place the vehicle into a requested propulsion operating state; and
in response to receiving the vehicle propulsion operation change request, transitioning from the intermediary propulsion operating state to the requested propulsion operating state.

4. The method of claim 1, further comprising the step of determining a state of charge of a battery that is included in the vehicle and that is used to power the first electric motor of the vehicle, and wherein the anticipatory vehicle propulsion system transition process is carried out when the state of charge of the battery exceeds or is equal to the state of charge threshold.

5. The method of claim 4, further comprising the step of, when the state of charge of the battery is less than the state of charge threshold, forgoing the anticipatory vehicle propulsion system transition process.

6. The method of claim 5, wherein the forgoing step includes waiting for the vehicle propulsion operation change request and, in response to the vehicle propulsion operation change request, transitioning from a present propulsion operating state to a requested propulsion operating state directly.

7. The method of claim 1, wherein the one or more vehicle sensors includes a camera, wherein the camera is configured to capture images and send the captured images to an onboard computer installed on the vehicle, and wherein the onboard computer is configured to carry out the monitoring step based at least partly on the captured images.

8. The method of claim 7, wherein the camera is either a front-facing camera that is mounted or installed on the vehicle such that a field of view of the camera includes an area in front of the vehicle or a rear-facing camera that is mounted or installed on the vehicle such that a field of view of the camera includes an area behind the vehicle, and wherein the onboard computer is configured to process the images to determine a vehicle traffic condition of one or more other vehicles, and wherein the anticipating step is at least partly based on the vehicle traffic condition of the one or more other vehicles.

9. The method of claim 1, wherein the vehicle includes a primary propulsion system that includes the internal combustion engine, the first electric propulsion motor, and a second electric propulsion motor, wherein the first electric propulsion motor and the second electric propulsion motor are coupled to a transmission included in the primary propulsion system.

10. The method of claim 9, wherein the anticipated vehicle propulsion operation change indicates that an increase in vehicle speed is anticipated, and wherein the operating step includes increasing an engine speed of the internal combustion engine and decreasing a speed of the second electric propulsion motor.

11. The method of claim 10, wherein the operating step further includes increasing the speed of the first electric propulsion motor while the vehicle speed is maintained.

12. A method of placing a hybrid vehicle having a plurality of electric propulsion motors into an operating state in anticipation of a vehicle event, the method comprising:
receiving images using at least one camera included in the vehicle, wherein the at least one camera is configured to capture the images of an area surrounding the vehicle;
anticipating a vehicle propulsion operation change based on receiving an indication of a vehicle event associated with a change in vehicle propulsion output, wherein the indication of the vehicle event associated with the change in vehicle propulsion output is at least partly based on the received images;
determining a state of charge of a vehicle battery that provides electric power as a primary power source to the plurality of electric motors included in the vehicle;

in response to anticipating the vehicle propulsion operation change and when the state of charge of the vehicle battery is greater than or equal to a state of charge threshold value, then carrying out an anticipatory vehicle propulsion system transition that includes:
  obtaining a present operating state or parameter;
  determining an anticipated propulsion operating state or parameter based on an anticipated vehicle propulsion operation change;
  obtaining an intermediary propulsion operating state based on the present propulsion operating state or parameter and/or based on the anticipated propulsion operating state or parameter; and
  operating an internal combustion engine of the vehicle and the plurality of electric propulsion motors of the vehicle such that the vehicle is placed in the intermediary propulsion operating state;
receiving a vehicle propulsion operation change request after the operating step, wherein the vehicle propulsion operation change request reflects an intention to place the vehicle into a requested propulsion operating state; and
in response to receiving the vehicle propulsion operation change request, transitioning from the intermediary propulsion operating state to the requested propulsion operating state using the internal combustion engine and/or at least one of the plurality of electric propulsion motors.

13. The method of claim 12, wherein the change in vehicle propulsion output includes an increase in vehicle speed, wherein the present operating state or parameter includes a first vehicle speed, wherein the anticipated operating state or parameter includes a second vehicle speed, wherein the intermediary operating includes a third vehicle speed, and wherein the first vehicle speed and the third vehicle speed are the same while the second vehicle speed is greater than the first vehicle speed and the third vehicle speed.

14. The method of claim 13, wherein the indication of the change in vehicle propulsion output, which includes the increase in vehicle speed, is used for determining the anticipated propulsion operating state or parameter, and wherein the anticipated propulsion operating state or parameter includes an increase in engine speed of the internal combustion engine.

15. The method of claim 14, wherein the anticipated propulsion operating state or parameter further includes a decrease in motor speed of the at least one of the plurality of electric propulsion motors.

16. The method of claim 12, wherein the at least one camera includes either or both of a front-facing camera that is mounted or installed on the vehicle such that a field of view of the camera includes an area in front of the vehicle or a rear-facing camera that is mounted or installed on the vehicle such that a field of view of the camera includes an area behind the vehicle, and wherein an onboard computer is configured to process the images to anticipate the vehicle event associated with the change in vehicle propulsion output.

17. The method of claim 16, wherein the vehicle further includes a global navigation satellite system (GNSS) receiver, and wherein the method further comprises the steps of:
  receiving a plurality of GNSS signals from a constellation of GNSS satellites; and
  determining a vehicle location using the plurality of GNSS signals at the GNSS receiver, wherein the anticipating step is further based on the vehicle location.

18. The method of claim 17, wherein the vehicle includes roadway data that indicates geographical boundaries of one or more roadways near the vehicle, wherein the anticipating step includes using the roadway data in conjunction with the vehicle location and the images from the at least one camera in a corroborating fashion so as to increase the accuracy of anticipating the vehicle propulsion operation change.

19. The method of claim 12, wherein the indication of the vehicle event associated with the change in vehicle propulsion output is based on any one or more of the following: roadway data received from a remote facility, traffic data received from the remote facility, vehicle measurement and/or operation data obtained from other nearby vehicles, and/or sensor data from one or more vehicle sensors included on the vehicle.

20. The method of claim 19, wherein the vehicle includes a vehicle-to-vehicle (V2V) unit that enables communications with the other nearby vehicles, and wherein the vehicle measurement and/or operation data includes data received from at least one of the other nearby vehicles via the V2V unit.

* * * * *